United States Patent
Fischer

(10) Patent No.: US 10,458,368 B2
(45) Date of Patent: Oct. 29, 2019

(54) EGR SYSTEM WITH PARTICLE FILTER FOR A GASOLINE ENGINE

(71) Applicant: TENNECO GMBH, Edenkoben (DE)

(72) Inventor: Michael Fischer, Mainz (DE)

(73) Assignee: TENNECO GMBH, Edenkoben (DE)

( * ) Notice: Subject to any disclaimer, the term of this patent is extended or adjusted under 35 U.S.C. 154(b) by 151 days.

(21) Appl. No.: 14/721,256

(22) Filed: May 26, 2015

(65) Prior Publication Data

US 2016/0177887 A1 Jun. 23, 2016

(30) Foreign Application Priority Data

Dec. 17, 2014 (DE) .................... 10 2014 118 813

(51) Int. Cl.
*F02B 33/44* (2006.01)
*F02M 25/07* (2006.01)
(Continued)

(52) U.S. Cl.
CPC ........... *F02M 26/15* (2016.02); *F01N 3/2066* (2013.01); *F02M 26/04* (2016.02); *F02M 26/05* (2016.02);
(Continued)

(58) Field of Classification Search
CPC ........ F02M 26/15; F02M 26/04; F02M 26/05; F02M 26/06; F02M 26/07; F02M 26/08;
(Continued)

(56) References Cited

U.S. PATENT DOCUMENTS

| 3,605,710 A | 9/1971 | Helwig |
| 4,345,572 A | 8/1982 | Suzuki et al. |
| (Continued) | | |

FOREIGN PATENT DOCUMENTS

| CN | 102168599 A | 8/2011 |
| CN | 102235230 A | 11/2011 |
| (Continued) | | |

OTHER PUBLICATIONS

Hoffmeyer et al., CARE-Catalytic Reformated Exhaust Gases in Turbocharged DISI-Engines, SAE Int. J. Fuels Lubr., 2009, pp. 139-148, vol. 2, Issue 1.

*Primary Examiner* — Thai Ba Trieu
(74) *Attorney, Agent, or Firm* — Hudak, Shunk & Farine Co. LPA

(57) ABSTRACT

An exhaust gas system for a gasoline engine with an exhaust gas pipe connectible to an outlet manifold, with an inlet pipe connectible to an inlet manifold, whereas a main exhaust catalyst is provided within the exhaust gas pipe wherein at least one first exhaust gas recirculation pipe is provided which branches off from the exhaust gas pipe and ends in the inlet pipe, whereas at least one particle filter is positioned within the first exhaust gas recirculation pipe and/or within the exhaust gas pipe upstream of the first exhaust gas recirculation pipe, wherein optionally at least a second exhaust gas recirculation pipe is provided, whereas at least one particle filter is provided which is positioned within the second exhaust gas recirculation pipe and/or which is positioned within the exhaust gas pipe upstream of the second exhaust gas recirculation pipe.

28 Claims, 9 Drawing Sheets

(51) Int. Cl.
  *F01N 5/04* (2006.01)
  *F02M 26/15* (2016.01)
  *F02M 26/04* (2016.01)
  *F01N 3/20* (2006.01)
  *F02M 26/05* (2016.01)
  *F02M 26/06* (2016.01)
  *F02M 26/23* (2016.01)
  *F02M 26/35* (2016.01)
  *F02M 26/42* (2016.01)
  *F02M 26/43* (2016.01)

(52) U.S. Cl.
  CPC ............ *F02M 26/06* (2016.02); *F02M 26/23* (2016.02); *F02M 26/35* (2016.02); *F02M 26/42* (2016.02); *F02M 26/43* (2016.02)

(58) Field of Classification Search
  CPC ........ F02M 26/09; F02M 26/22; F02M 26/23; F02M 26/27; F02M 26/30; F02M 26/35; F02M 26/36; F02M 26/38; F02M 26/39; F02M 26/42; F02M 26/43; F01N 3/2066
  USPC ........ 60/605.2, 605.1, 612, 280; 123/568.12, 123/568.18
  See application file for complete search history.

(56) References Cited

U.S. PATENT DOCUMENTS

| | | | |
|---|---|---|---|
| 4,356,806 A | 11/1982 | Freesh | |
| 5,239,960 A | 8/1993 | Sasaki et al. | |
| 5,592,925 A | 1/1997 | Machida et al. | |
| 5,671,600 A | 9/1997 | Pischinger et al. | |
| 6,138,649 A | 10/2000 | Khair et al. | |
| 6,143,272 A * | 11/2000 | Narula | B01D 53/94 423/213.2 |
| 6,474,060 B2 | 11/2002 | Khair | |
| 6,981,375 B2 * | 1/2006 | Sisken | F02M 26/08 60/605.2 |
| 7,131,271 B2 * | 11/2006 | Bulicz | F02M 26/15 60/605.2 |
| 7,461,641 B1 * | 12/2008 | Styles | F02M 26/25 60/605.2 |
| 7,490,462 B2 | 2/2009 | Roozenboom et al. | |
| 7,921,639 B2 | 4/2011 | Silbermann et al. | |
| 8,327,628 B2 | 12/2012 | Ruona et al. | |
| 8,341,939 B2 * | 1/2013 | Lee | F01N 3/033 60/280 |
| 8,479,496 B2 * | 7/2013 | Gonze | F01N 3/027 60/286 |
| 2010/0223919 A1 * | 9/2010 | Lee | B01D 53/9418 60/301 |
| 2011/0023455 A1 * | 2/2011 | Lee | F01N 3/105 60/286 |
| 2011/0072794 A1 | 3/2011 | Nieuwstadt et al. | |
| 2011/0072795 A1 * | 3/2011 | Kerns | F02D 41/0007 60/285 |
| 2011/0107739 A1 * | 5/2011 | Shimizu | F02D 41/0007 60/273 |
| 2011/0125361 A1 * | 5/2011 | Weber | F02B 29/0493 123/41.01 |
| 2011/0160984 A1 | 6/2011 | Inoue | |
| 2011/0219750 A1 | 9/2011 | Sakurai et al. | |
| 2011/0252773 A1 * | 10/2011 | Arnold | B01D 46/2429 60/297 |
| 2011/1271661 | 11/2011 | Knafl et al. | |
| 2012/0079814 A1 | 4/2012 | Blomquist | |
| 2012/0312001 A1 * | 12/2012 | Nam | F02M 26/06 123/568.12 |
| 2013/0118162 A1 * | 5/2013 | Hepburn | F01N 3/021 60/602 |
| 2013/0186074 A1 * | 7/2013 | Kanba | F01N 3/2033 60/286 |
| 2013/0263593 A1 * | 10/2013 | Gonzalez Delgado | F02M 26/06 60/605.2 |
| 2014/0020361 A1 | 1/2014 | Warey et al. | |
| 2014/0069082 A1 * | 3/2014 | Alger, II | F02B 47/08 60/274 |
| 2014/0069086 A1 * | 3/2014 | Lapointe | F02M 26/04 60/278 |
| 2014/0165560 A1 * | 6/2014 | Henry | F02M 26/15 60/605.2 |

FOREIGN PATENT DOCUMENTS

| | | | | |
|---|---|---|---|---|
| CN | 103080493 A | | 5/2013 | |
| DE | 697 37 838 T2 | | 2/2008 | |
| DE | 102009022938 A1 | * | 6/2010 | ............ F02M 26/35 |
| DE | 10 2010 046 900 A1 | | 4/2011 | |
| DE | 1020111000295 A1 | | 11/2011 | |
| DE | 102012107649 A1 | | 2/2012 | |
| DE | 10 2010 045 503 A1 | | 3/2012 | |
| DE | 10 2010 041 982 A1 | | 4/2012 | |
| DE | 102011015629 A1 | | 4/2012 | |
| DE | 102011051987 A1 | | 5/2012 | |
| DE | 102011113809 | * | 3/2013 | ............ F01N 3/2066 |
| DE | 102011118337 A1 | | 5/2013 | |
| DE | 102011120508 A1 | | 6/2013 | |
| DE | 102013003701 A1 | | 9/2014 | |
| DE | 102013110127 A1 | | 3/2015 | |
| EP | 1574691 A2 | * | 9/2005 | ......... F02D 41/0007 |
| EP | 1607595 A1 | * | 12/2005 | ............ F01N 3/035 |
| EP | 1795723 A2 | | 6/2007 | |
| EP | 2116703 A1 | | 11/2009 | |
| EP | 2194351 B1 | | 5/2012 | |
| EP | 2 592 247 A1 | | 5/2013 | |
| EP | 2 808 518 A1 | | 3/2014 | |
| FR | 2894624 A1 | * | 6/2007 | ............ F02B 37/18 |
| GB | 2484495 A | | 4/2001 | |
| GB | 2473821 A | * | 3/2011 | ............ F02M 26/24 |
| JP | 2010-238414 | | 10/2010 | |
| JP | 2011106361 A | * | 6/2011 | |
| JP | 2011163176 A | * | 8/2011 | |
| JP | 2013217322 A | * | 10/2013 | |
| WO | 2013175091 A1 | | 11/2013 | |
| WO | 2014/207023 A1 | | 12/2014 | |

* cited by examiner

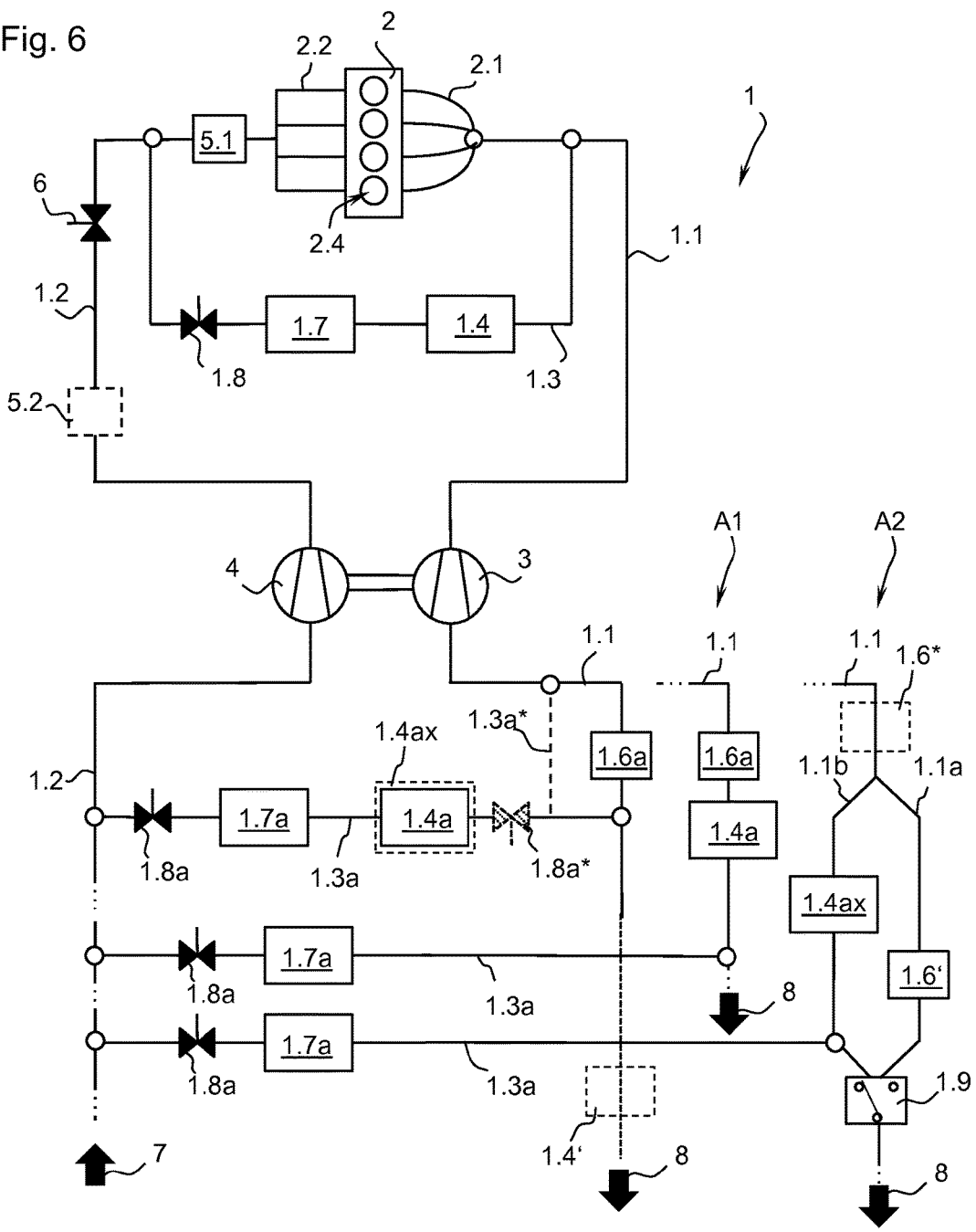

EGR SYSTEM WITH PARTICLE FILTER FOR A GASOLINE ENGINE

FIELD OF THE INVENTION

The invention relates to an exhaust gas recirculation system (EGR system) for a gasoline engine with an exhaust gas pipe connectible to the outlet manifold, with an inlet pipe connectible to the inlet manifold for charge air or combustion air whereas the exhaust gas pipe is provided with a main exhaust catalyst. In the case of a turbocharged engine, a compressor is situated in the inlet pipe which, in a turbocharged engine, is connected to a turbine situated in the exhaust gas pipe. The compressor can also be alternatively driven.

BACKGROUND OF THE INVENTION

The wording and definitions for "Otto" engines, i. e. "gasoline" engines are different in the USA on the one hand and at least Europe on the other hand. Therefore, this application renders the following definitions for such engines.

Gasoline engines or Otto-engines rank among all non-diesel engines, thus all SI-engines (Spark Ignited) having a spark plug as well as CAI-engines (Controlled Auto Ignition) running with Otto-fuel like gasoline, alcohol or gas. Diesel engines in contrast to that are HCCI-engines (Homogeneous Charge Compression Ignition) running with diesel or oils or other fuels.

An exhaust gas recirculation system for diesel engines is known from U.S. Pat. No. 5,671,600 A. A particle filter is provided at the exhaust outlet or at the exhaust gas pipe which connects to an exhaust gas recirculation pipe. The exhaust gas recirculation pipe flows into the inlet pipe upstream of a charge air compressor. Within the exhaust gas recirculation pipe, there is a valve to alter the exhaust gas mass flow. The particle filter protects the charge air compressor and/or charge air cooler from contamination.

DE 10 2011 015 629 A1 describes the application of a three-way catalyst within an exhaust gas recirculation pipe of a gasoline engine to improve the emission of pollutants, including a reduction of HC, NOx, and CO.

EP 2 194 351 B1 describes a charge air cooler with integrated diesel particle filter protecting the charge air compressor from contamination.

DE 10 2012 107 649 B4 describes a particle filter in the exhaust gas pipe, upstream of an exhaust gas recirculation pipe, supplying a pressure wave charger, as used for diesel engines according to the applicant's knowledge.

SUMMARY OF THE INVENTION

The object of the invention is to develop an EGR system for a gasoline engine and to arrange it such that minimal contamination of components in the intake system is achieved as well as improved combustion which will allow an increased operational reliability and apart from lower particle emissions an improved efficiency of the engine.

An EGR system usually consists of at least an exhaust gas recirculation pipe (EGR pipe), an exhaust gas recirculation cooler (EGR cooler) and an exhaust gas recirculation valve (EGR valve).

According to the invention, the object is achieved in that at least one first exhaust gas recirculation pipe is provided which branches off from the exhaust gas pipe and ends in the inlet pipe, whereas at least one particle filter is positioned within the exhaust gas recirculation pipe or within the exhaust gas pipe upstream of the exhaust gas recirculation pipe and optionally a turbine is provided within the exhaust gas pipe, whereas as an alternative to the first exhaust gas recirculation pipe or in addition to the first exhaust gas recirculation pipe at least a second exhaust gas recirculation pipe is provided which branches off from the exhaust gas pipe and ends in the inlet pipe, whereas at least one particle filter is provided
 which is positioned within the second exhaust gas recirculation pipe and/or
 which is positioned within the exhaust gas pipe upstream of the second exhaust gas recirculation pipe.

The second exhaust gas recirculation pipe only has a technical effect that deviates from the first exhaust gas recirculation pipe when a turbine is provided in the exhaust gas pipe. The second exhaust gas recirculation pipe branches off for this purpose downstream of the turbine, while the first EGR branches off upstream of the turbine, so that with the first and second EGRs, different types of the exhaust gas recirculation architectures defined below are possible as a supplement or an alternative, such as a high-pressure EGR (HP-EGR) or low-pressure EGR (LP-EGR).

Therefore, the object is achieved by the inventive combination of three features, namely that
x) at least one first exhaust gas recirculation pipe is provided which branches off from the exhaust gas pipe and ends in the inlet pipe, whereas at least one particle filter is positioned
 within the first exhaust gas recirculation pipe and/or
 within the exhaust gas pipe upstream of the first exhaust gas recirculation pipe;
y) a turbine is provided within the exhaust gas pipe;
z) at least a second exhaust gas recirculation pipe is provided which branches off from the exhaust gas pipe and ends in the inlet pipe, whereas at least one particle filter is provided
 which is positioned within the second exhaust gas recirculation pipe and/or
 which is positioned within the exhaust gas pipe upstream of the second exhaust gas recirculation pipe,
whereas the feature x) alone or one of the feature combinations x)+y) or y)+z) or x)+y)+z) are to be applied. Feature z) alone equates feature x) alone for lack of a turbine.

In case of a second exhaust gas recirculation pipe being present, at least one particle filter can be positioned in the exhaust gas pipe between the first exhaust gas recirculation pipe and the second exhaust gas recirculation pipe.

The first exhaust gas recirculation pipe can also branch off from the outlet manifold and/or end in the inlet manifold. The second exhaust gas recirculation pipe ends in case of the existence of a compressor within the inlet pipe typically ahead of the compressor.

A particle filter is specified in particular by the fact that particles that are larger than 25-15 nm and in particular are larger than 10 nm are retained. Ideally, the retained particle size could be even smaller.

In the EGR system and the inlet system of gasoline engines, deposits can be observed known as "wet soot" or "fouling" which can have serious consequences such as blockage, uneven distribution and irregular combustion. Thus, EGR systems in gasoline engines have only rarely and with restrictions been used.

It is advantageous to have cooling for the recirculated exhaust gas in EGR systems for gasoline engines in order to optimize combustion, as the recirculation of uncooled exhaust gas, especially under heavy loads or full throttle, leads to higher intake temperatures due to the hot exhaust gas fed. This leads to filling losses and an increased tendency of the gasoline engine to knock. This results in an undesired loss of engine performance. These disadvantages can be reduced by cooling the recirculated exhaust gas. This however leads to an increased amount of condensation—made up of water and/or hydrocarbons or hydrocarbon compounds and incompletely burned combustion particles—in the recirculated exhaust gas, resulting in an increased level of soot in the form of wet, adhesive deposits in the EGR system and air intake system. A combination of the particle filter and charge air cooler, as described in EP 2 194 351 B1 for a diesel particle filter, is not an option due to the risk of blockage by the aforementioned deposits in the particle filter.

Furthermore, a particle filter only achieves the minimum temperature in the particle filter required for the self-regeneration of the particle filter in a clearly limited operating range. In this case, additional active regeneration measures are required, which are of a disadvantage in terms of operation and cost. In contrast to the wet components carried in gasoline engine exhaust gas, the diesel particles are dry components which have less inclination towards condensation and adhesion. Furthermore, active regeneration measures for the particle filter in diesel engines are required in very broad engine operation ranges due to the low exhaust gas temperatures there in general.

Particle filters for gasoline engines retain particles, just as diesel particle filters do. Sufficiently high exhaust temperatures and an oxygen surplus are required for the regeneration of the particle filters, that is the combustion of the filtered particles. These requirements for the exhaust gas characteristics in EGR systems of gasoline engines are available after a warm-up phase. In broad operational ranges of the gasoline engines, i. e. in a fired status (lambda=1 by stoichiometrically driven gasoline engines), however, there is a lack of oxygen surplus as the basis for the combustion of particles in the particle filter. The particles are thus only transported to the particle filter in the exhaust gas stream, part of it being burned with the remaining oxygen available and the other part being retained there. Regeneration, hence the combustion of the particles, can occur in such engine operating status in which sufficient oxygen is provided in the exhaust gas for burning the particles in the particle filter, for example in engine overrun phases, when injection is switched off. In this overrun phase, i. e. when the engine is still in motion and the inlet and exhaust valves active, oxygen enters the EGR system through the open EGR valve and flows through the particle filter integrated there. With sufficient temperature in the particle filter, the particles will then be burnt into CO2. Under some conditions, CO and NOx may also be produced.

Regardless of this purification step, the above listed advantages of using recirculated exhaust gas for a gasoline engine only have a greater effect by increasingly cooling the exhaust gas close to the level of the possibly compressed and recooled intake air. The use of such a filter in the exhaust recirculation pipe does not only result in the protection of the air intake system from fouling by the particles carried in the exhaust gas and other substances, but also ensures the broad application of an exhaust gas cooler within the EGR pipe to avoid filling losses, increased knock tendency and subsequent loss of performance.

The inventive external EGR system for a gasoline engine ensures a reduction of particles in the recirculated exhaust gas, allowing an increased cooling of the recirculated exhaust gas, especially at a higher engine load and engine speed, and hence a reduced fuel consumption.

In contrast to this, an EGR system is used for a diesel engine in particular in order to reduce the NOx exhaust in broad partial load areas or at low engine speeds. When an EGR system is used, however, there is of necessity an increase in the soot particle exhaust due to the combustion process in the diesel engine, as well as to an increase in the use of fuel.

As a result of purified, recirculated exhaust gas, lower pollution of components in the exhaust gas recirculation and suction system is achieved, as is improved combustion, which enables increased operational safety and alongside reduced pollutant emissions improved efficiency of the engine at the same time.

It is obvious that all advantages and disadvantages as well as the operating modes when applying an EGR system to a diesel engine are not transferable to a gasoline engine.

It can be advantageous if the second exhaust gas recirculation pipe branches off upstream or downstream of the exhaust catalyst, whereas a coated particle filter is provided at the branch upstream. At a branch downstream, the cleaning is effected by the exhaust catalyst.

It can also be advantageous if there is an exhaust gas catalyst, such as an oxidation catalyst or a 3-way catalyst, upstream of the particle filter, whereas the catalyst is positioned within the exhaust gas recirculation pipe or within the exhaust gas pipe.

The aforementioned advantages of reduced pollutant emissions are achieved through the 3-way catalyst or oxidation catalyst. In this case, an uncoated particle filter can additionally or alternatively be positioned separately ahead of or preferably behind the catalyst in the exhaust gas recirculation pipe. Hence, an additional increase of pressure in the exhaust gas pipe and thus a higher fuel consumption of the gasoline engine will be avoided.

If the exhaust gas that is to be recirculated is removed ahead of the exhaust gas system catalyst, an additional 3-way catalyst or oxidation catalyst can be integrated into the exhaust gas recirculation pipe. These catalysts, however, represent further structural components which are alternatively avoidable with a catalytically coated particle filter.

In any case, the oxidation of pollutant components contributes to heat development and thus to the heating of the upstream particle filter. This extends the use of independent regeneration of the particle filter in overrun mode to further operational conditions of the engine.

Moreover, it can be advantageous if at least one further exhaust gas recirculation pipe is provided which branches off at the first exhaust gas recirculation pipe and ends in the inlet pipe, whereas optionally at least one cooler is provided within at least one of the further exhaust gas recirculation pipes. Having the further exhaust gas recirculation pipe, different varieties of exhaust gas recirculation can be realized, especially a maximum pressure EGR.

It can be advantageous if the further exhaust gas recirculation pipe branches off downstream of the particle filter of the first exhaust gas recirculation pipe. Hence the further exhaust gas recirculation pipe is provided with clean exhaust gas.

It can also be advantageous if at least one particle filter has a catalytically active coating, such as a 3-way coating to change NOx, CO and HC into N2, CO2 and H2O or an oxidation coating similar to an oxidation catalyst to oxidate CO and HC to CO2 and H2O. This leads to reduced particle emissions in the intake system which can even be an additional advantage to combustion. The particle filter coating is active when the engine is in a firing status. This also applies to the filtering effect of the particle filter. In the overrun phase, regeneration of the particle filter can occur. A catalytic effect is not necessary due to the oxygen surplus or lack of fuel supply in the overrun phase. By combining particle filtering and catalytic conversion of further incomplete combustion products, the recirculated exhaust gas has a high degree of purity, in terms of combustion products and particles. This has a positive effect both on the accumulation of deposits in the intake system and on combustion, hence on the pollutant emissions of the gasoline engine.

Further, it can be advantageous if the main exhaust catalyst is provided downstream of the branch of the first exhaust gas recirculation pipe or upstream of the branch of the second exhaust gas recirculation pipe or downstream of the branch of the second exhaust gas recirculation pipe. Depending on the position, a catalytic purification of the exhaust gas flow is ensured. By means of a combination with coated particle filters, an extensive catalytic purification of the entire exhaust gas flow can be effected.

It can also be advantageous if at least one particle filter is free of a coating with catalytic effect, converting CO, HC and/or NOx and is positioned downstream of the main catalyst and optionally a further catalyst is positioned within the first exhaust gas recirculation pipe upstream of the respective particle filter. This particle filter hence has no function as oxidation catalyst.

In connection with the innovative design and arrangement, it can be advantageous if at least one cooler is arranged downstream of at least one particle filter within the exhaust gas recirculation pipe and/or within the second exhaust gas recirculation pipe. The cooler is spatially or at least thermally separated from the particle filter, so that the particle filter can have the highest possible temperatures in various engine operating conditions, so that it regenerates through oxidation of the filtered components, in the presence of an oxygen surplus in the exhaust gas (Lambda>1). Thus, the broadest possible operating range of the particle filter is achieved for regeneration. The cooler is designed either as exhaust gas air-, exhaust gas cooling water- or as exhaust gas low temperature cooling water-cooler. In special embodiments, several exhaust gas recirculation coolers, which can also be designed to be connectible, can be arranged in a series or in parallel.

For this purpose, it can be advantageous with an HP-EGR, for example, when the cooler on the outlet side has an exhaust gas set temperature Ta which is higher than the dew point of the substances contained in the exhaust gas, e.g. $250°>=Ta>=100°$ or $200°>=Ta>=105°$. The exhaust gas set temperature Ta is here selected to be so high that condensation of the substances contained in the exhaust gas as well as water is prevented as far as possible. Cooling to below $100°$ C. occurs only in the second cooling stage following the mixing of exhaust gas and fresh air in the inlet or charge air pipe shortly before it enters the engine. As a result, condensating water can flow directly into the engine combustion chamber and through evaporation, a positive effect can emerge on the engine combustion. Due to the fact that the exhaust gas is purified by the particle filter, there is no risk of sootiness for a charge air cooler close to the engine.

It can also be advantageous if at least one compressor is arranged within the inlet pipe whereas a) the first exhaust gas recirculation pipe branches off upstream of the turbine and ends either upstream or downstream of the compressor, and/or b) the second exhaust recirculation pipe branches off downstream of the turbine and ends upstream of the compressor. Branching off upstream of the turbine ensures higher exhaust temperatures which have a generally positive effect on particle filter regeneration and the reduction of pollutants. Opening downstream of the compressor has the advantage of the control section being shorter. This combination of branching off upstream of the turbine and opening downstream of the compressor is known as high pressure EGR (HP EGR). However, there may not be sufficiently high pressure difference between the exhaust gas system and intake system in all desired operating conditions to introduce the desired amount of recirculated exhaust. If additional cooling of the recirculated exhaust gas is necessary, the purified exhaust gas can also be introduced into the intake system behind the compressor and ahead of the charge air cooler. The exhaust gas is thus cooled not only in the EGR cooler, but also in the charge air cooler. One could also envision an arrangement in which the charge air cooler is so effectively placed that no EGR cooler is necessary for the recirculated exhaust gas in the EGR pipe.

Branching off upstream of the turbine, in combination with opening upstream of the compressor, is known as maximum pressure EGR (MP EGR) and ensures a wide pressure difference within the EGR pipe as well as greater required quantities of recirculated exhaust gas. However, the control section becomes longer than in the case of the HP EGR and the compressor and turbine eventually need to be adapted to fit the modified mass flow rates.

Branching off downstream of the turbine in combination with opening upstream of the compressor is known as low pressure EGR (LP EGR). This arrangement has the advantage that exhaust gas can be recirculated to the intake system under such operating conditions that the pressure difference would be insufficient for a HP EGR. Furthermore, the LP EGR is characterized by a lower exhaust gas temperature, as the exhaust gas is removed behind the turbine, whereas the necessary cooling performance of the EGR cooler is reduced. Additionally, the compressor in the intake path needs to be designed for the larger mass flow rate.

If the exhaust gas is removed behind the exhaust gas pipe catalyst, the particle filter arranged in the exhaust gas recirculation pipe does not require any coating for the further conversion of pollutants.

It can also be advantageous if at least one further exhaust gas recirculation pipe ends within the inlet pipe ahead of the compressor or behind the compressor. By means of the further exhaust gas recirculation pipe, a maximum pressure EGR as well as a high pressure EGR can be realized.

Moreover, it can be advantageous if two compressors are arranged within the inlet pipe, whereas at least one further exhaust gas recirculation pipe ends between both compressors. By using two compressors, interim solutions of maximum pressure EGR, high pressure EGR and/or low pressure EGR can be realized.

In this connection, it can be advantageous if two compressors are arranged within the inlet pipe and at least two further exhaust gas recirculation pipes are provided which are connected in parallel via a common supply pipe branching off at the first exhaust gas recirculation pipe, whereas at least one further exhaust gas recirculation pipe ends ahead of at least one of the compressors and/or at least one further exhaust gas recirculation pipe ends behind at least one of the compressors. Each compressor is preferably provided with a turbine. At least one exhaust gas recirculation pipe can be part of the supply pipe if it is designed as a continuation of the supply pipe.

It can also be advantageous if a charge air cooler and/or a charge air throttle valve are provided within the inlet pipe, whereas the opening of the first exhaust gas recirculation pipe is positioned downstream of a position of the charge air cooler and/or downstream of a position of the charge air throttle valve. In the inlet pipe through to the opening of the EGR pipe, only fresh air is usually allowed to flow. The charge air cooler could in this case also be described as a fresh air cooler.

As an alternative, it can be advantageous when a charge air cooler and/or a charge air throttle valve are provided in the inlet pipe, wherein the opening of the first exhaust gas recirculation pipe is positioned upstream from a position for the charge air cooler. The purification of the recirculated exhaust gas by the particle filter ensures the effective use of the charge air cooler for the fresh air-exhaust gas mixture. Sootiness of the charge air cooler is prevented through the use of the particle filter. By using an EGR pipe with the gasoline engine, soot particles and the exhaust gas temperature in high load operation can be significantly reduced. As a result, when a particle filter is used in the EGR pipe and/or during intensive cooling of the recirculated exhaust gas (EGR cooling), the charge air cooling can be intensified to such a degree that the exhaust gas temperature can decrease to the level of diesel engines or the suction temperature prior to cylinder entry to the level of gasoline engines without EGR. As a result, the tendency to knock by the gasoline engine is considerably reduced, and significant consumption improvements can be achieved.

For this purpose, it can be advantageous when the charge air cooler has a charge set temperature Tu on the outlet side, with $50°>=Tu$. Due to the intensive cooling of the charge air, the exhaust gas temperature of the gasoline engine can be reduced to the level of diesel engines (approx. 850° C.). This has a very positive effect on the tendency to knock by the gasoline engine, and considerable improvements in fuel consumption are possible.

Furthermore, it can be advantageous when in addition to the charge air cooler a fresh air cooler is positioned in the inlet pipe, wherein the fresh air cooler is positioned upstream of the opening of the exhaust gas recirculation pipe. By means of the fresh air cooler, a separate cooling of the fresh air prior to mixing with the exhaust gas can be achieved. Since the temperature level of the compacted fresh air is not terribly high, at 150° C. to 160° C., separate cooling of the fresh air is also not necessary, whereby the fresh air-exhaust gas mixture can be cooled together in the charge air cooler as described above.

In this connection, it can be advantageous when the fresh air cooler has a fresh air set temperature Tf on the outlet side of $150°>=Tf>=90°$. The cooling conducted in the fresh air system is certainly advantageous with a view to having a fresh air-exhaust gas mixture that is as cool as possible.

The reduced tendency to knock on the part of the gasoline engine, and considerable improvements in consumption, are achieved by the two- or three-stage cooling of the suctioned charge air by the EGR cooler, the charge air cooler and, in some cases, the fresh air cooler, using the different temperature levels.

It can be advantageous if a charge air cooler is provided within the inlet pipe, whereas the opening of at least one further exhaust gas recirculation pipe is positioned upstream of a position of the charge air cooler.

It can also be advantageous if a throttle valve is provided in the first exhaust gas recirculation pipe and/or in the second exhaust gas recirculation pipe, by which an exhaust mass flow within the first exhaust gas recirculation pipe is adjustable depending on the operating point, whereas the throttle valve is positioned downstream or upstream of the particle filter. In overrun phases of the engine, particle filter regeneration can be influenced by the control valve as to the amount of recirculated fresh air. In special designs, the throttle valve can also be arranged directly behind the particle filter. This also means that a common housing can be used. Positioning ahead of the particle filter leads to increased contamination of the throttle valve and would only come into consideration in exceptional cases.

It can also be advantageous if at least one cooler is provided within the first exhaust gas recirculation pipe and/or within the second exhaust gas recirculation pipe, whereas the throttle valve is provided downstream or upstream of the cooler. A separate cooling of the recirculated exhaust gas allows a reduction of the cooling power in the induction pipe or even lower temperatures in the induction pipe respectively.

Moreover, it can be advantageous if a further cooler is provided within the respective further exhaust gas recirculation pipe or if one further cooler is positioned in the supply pipe upstream of the respective further exhaust gas recirculation pipe. Hence, the cooling power is ensured in the individual paths and distributed accordingly.

It can also be advantageous if the exhaust gas pipe has two parallel running exhaust pipe sections which are switchable via an adjustable valve, whereas the exhaust catalyst is positioned in the exhaust pipe section and the particle filter as well as the branch for a further exhaust gas recirculation pipe are provided in the parallel exhaust pipe section. Hence, the further exhaust gas recirculation pipe can be avoided, whereas the catalytic purification of the exhaust gas is ensured in either case.

It can also be advantageous if the second exhaust gas recirculation pipe and the further exhaust gas recirculation pipe are coupled via an adjustable valve, whereas a cooler is provided downstream of the valve and/or a throttle valve is provided downstream of the cooler. By this architecture, a maximum pressure EGR and alternatively a low pressure EGR can be realized.

It can further be advantageous if a throttle valve is provided within the respective further exhaust gas recirculation pipe. The different further exhaust gas recirculation pipes can thus be optionally activated according to the moment and the exhaust gas volume.

Additionally, it can be advantageous if the throttle valve is positioned downstream of the cooler. Thus, it is protected from excessive temperatures.

It can also be advantageous if a main particle filter is provided downstream of the main exhaust gas catalyst which is free of a coating with a catalytic effect for converting CO, HC and/or NOx. Thus a comprehensive purification of the exhaust gas of particles is guaranteed.

A further advantage is that the turbine is designed as a VTG turbine. A VTG turbine is a turbine with variable turbine paddle geometry and is ideally continuously adjustable. It is only when EGR systems with particle filters are used that it becomes possible to reduce the gasoline engine exhaust gas temperature before entering the VTG turbine to a temperature level that corresponds to today's thermal and economic load limit of standard VTG turbines in diesel engines.

The lower exhaust gas temperature opens up a wider range of application for VTG turbines, and for the first time, they come into focus as an interesting alternative to the two-stage charging systems for gasoline engines. The control range of the exhaust gas counter-pressure before entering the turbine which is extended by the VTG function permits EGR systems in accordance with the HP or MP design to extend the range of functions to higher exhaust gas recirculation rates (EGR rates), in particular with low engine speeds and higher loads (LET—low-end torque). As a result, HP or MP designs can now cover engine map ranges that until now were only achievable with an LP design, and can thus retain and in some cases also improve their advantage in doing so due to the short control path. Furthermore, this advantage is increased through the use of VTG turbines, since the extended and flexible control of the exhaust gas counter-pressure permits extended, flexible adjustment of the EGR rate. The adjustment and adaptation of the EGR rate or the exhaust gas counter-pressure is increasingly important with higher EGR rates, since in comparison to a diesel engine, a gasoline engine reacts far more sensitively to changing EGR rates.

EGR systems with particle filters thus make the use of VTG turbines in gasoline engines attractive, and offer a cost-efficient alternative to two-stage systems. Conversely, the use of VTG turbines with HP and MP designs guarantees high EGR rates in broad operating ranges. VTG turbines which are more expensive, and which are thus high alloyed, as are known for gasoline engines without separate or two-stage exhaust gas recirculation cooling, and the additional costs that they entail, are therefore not necessary.

The object is also achieved by an exhaust gas system and/or a gasoline engine with an exhaust gas recirculation system or a gasoline engine with at least one total combustion chamber having a volume Vm, each having at least one exhaust gas recirculation system and/or an exhaust gas system as described above, whereas the particle filter has a total volume Vf, whereas the total volume Vf is defined by: $0.1\,Vm \leq Vf \leq 1\,Vm$ or particularly $0.1\,Vm \leq Vf \leq 0.5\,Vm$. The total volume Vf refers to the geometric volume of the particle filter, consequently the volume which the housing has for receiving the particle filter.

Additionally, it can be advantageous if several particle filters are provided having the total volume Vf altogether. The different particle filters can be arranged in the different exhaust gas pipes or recirculation pipes respectively and can be switched in series or in parallel.

In order to avoid grit from being brought into the suction tract by the EGR by using a filter, a further filter or sieve can also be positioned downstream of the particle filter in the EGR.

BRIEF DESCRIPTION OF THE DRAWINGS

Further advantages and particulars of the invention are described in the claims and in the description and are presented in the figures. They show:

FIG. 3a, 3b schematic diagrams of a combined HP and MP EGR with different cooler arrangement and introduction to the inlet pipe;

FIG. 6 a schematic diagram according to FIG. 1 with a charge air cooler and an inlet air cooler.

DETAILED DESCRIPTION OF THE INVENTION

Figure 1:
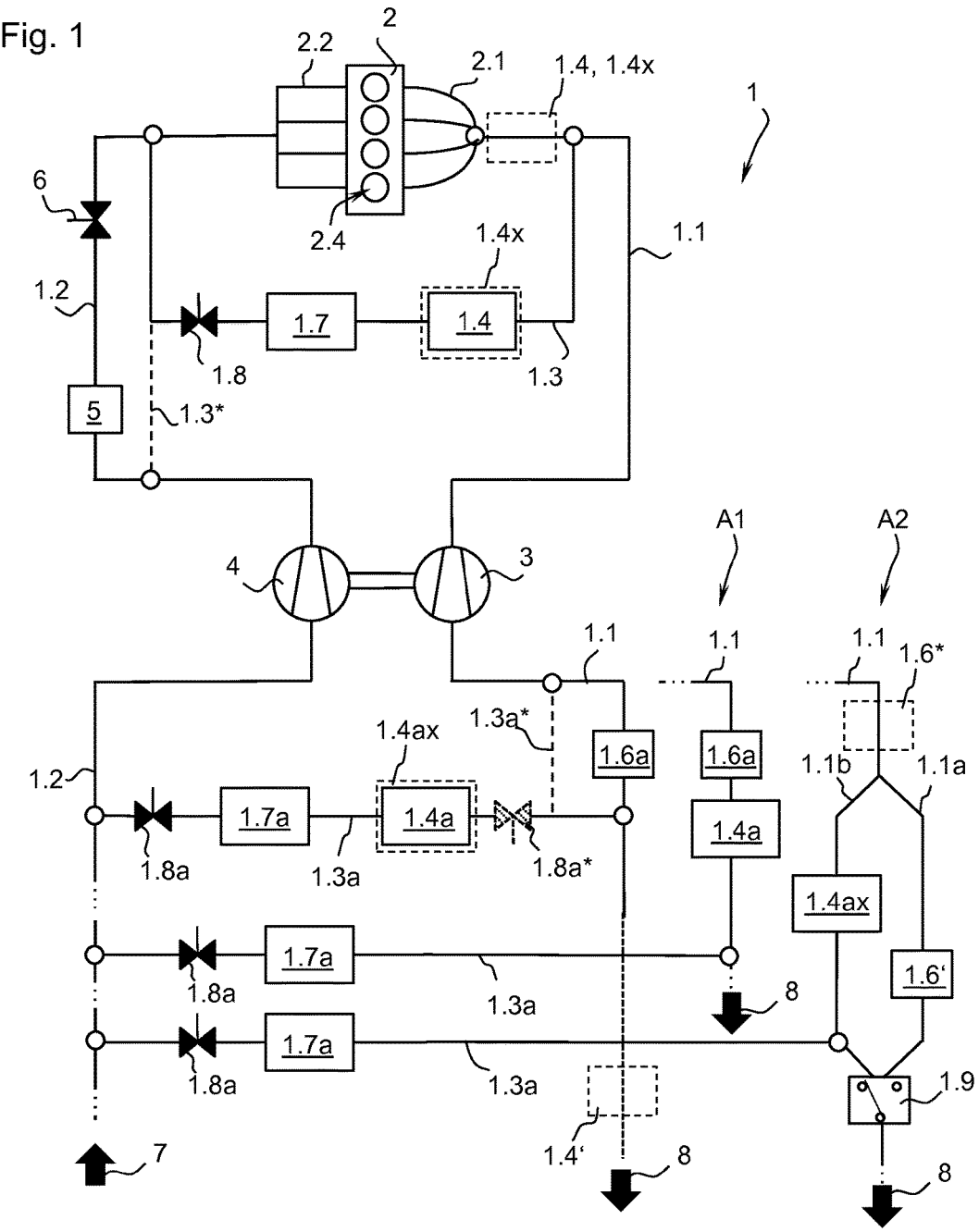
FIG. 1 a schematic diagram of a combinable HP and LP EGR.

In all schematic diagrams of FIGS. 1-5b, an exhaust gas recirculation system 1 (EGR system) is described which is integrated into the exhaust gas system and charge air system of a gasoline engine 2 having a cylinder capacity 2.4 with an outlet manifold 2.1 and an inlet manifold 2.2 as well as an exhaust gas turbine 3 and a charge air compressor 4. The exhaust gas system and charge air system have an exhaust pipe 1.1 attached to the outlet manifold 2.1 of the gasoline engine 2, in which the turbine 3 is integrated. At the end of the exhaust pipe 1.1, exhaust gas 8 exits the exhaust gas recirculation system 1 and flows into the further exhaust route, not shown here. Additionally, there is an inlet pipe 1.2 connected to the inlet manifold 2.2 of the gasoline engine 2, in which the compressor 4 is integrated. The inlet pipe 1.2 is supplied with fresh air 7 by an air supply system, not shown. Additionally, there is at least one exhaust gas recirculation pipe 1.3, 1.3a, 1.3b (EGR pipe) which branches off from the exhaust gas pipe 1.1 and flows into the inlet pipe 1.2.

Either a particle filter 1.4 is arranged in the EGR pipe 1.3, or as an alternative (shown as a broken line), a particle filter 1.4 is arranged in the exhaust gas pipe 1.1 upstream of the EGR pipe 1.3, which filters the exhaust gas 8 that is recirculated or is to be recirculated. Alternatively (shown as a broken line), the respective particle filter 1.4x can also be equipped with a 3-way catalyst coating or an oxidation coating, in order to fulfil a catalyst function.

Further, at least one EGR cooler 1.7, 1.7a, 1.7b is provided downstream of the particle filter 1.4, 1.4x in the EGR pipe 1.3. Downstream of the respective EGR cooler 1.7, 1.7a, 1.7b and before the opening into the inlet pipe 1.2, an EGR throttle valve 1.8, 1.8a, 1.8b is positioned to regulate the mass flow within the EGR pipe 1.3, 1.3a.

Generally, one distinguishes between three alternatives of exhaust gas recirculation, depending on the branch-off of the EGR pipe from the exhaust gas pipe 1.1 and the opening of the EGR pipe into the inlet pipe 1.2.

The combination of the branch-off of the EGR pipe 1.3 upstream of the turbine 3 and the opening of the EGR pipe 1.3 downstream of the compressor 4 is designated as High Pressure EGR (HP EGR).

The combination of the branch-off of the EGR pipe 1.3 upstream of the turbine 3 and the opening of the EGR pipe 1.3 upstream of the compressor 4 is designated as Maximum Pressure EGR (MP EGR).

The combination of the branch-off of the EGR pipe 1.3 downstream of the turbine 3 and opening upstream of the compressor 4 is designated as Low Pressure EGR (LP EGR).

The three EGR alternatives described above can be used individually or combined.

For further influence of the recirculated exhaust gas amounts, a throttle valve can be built into the inlet pipe 1.2 upstream of the introduction location of the exhaust gas circulation pipe 1.3.

In the diagram according to FIG. 1, different EGR types are shown additionally or alternatively. Within the inlet pipe 1.2, a charge air cooler 5 and a charge air throttle valve 6 are arranged downstream of the compressor 4.

There is a HP EGR, formed by the EGR pipe 1.3, which branches off upstream of the turbine 3 and ends downstream of the compressor 4. The opening occurs downstream of the charge air throttle valve 6. Alternatively, the EGR pipe 1.3* can end upstream of the charge air throttle valve 6 and upstream of the charge air cooler 5. As a rule, in the inlet pipe 1.2, fresh air 7 is guided through to the opening of the EGR pipe 1.3. The charge air is then composed of the fresh air 7 and the recirculated exhaust gas 8. The particle filter 1.4 can alternatively (see dotted lines) be positioned within the exhaust gas pipe 1.1 upstream of the EGR pipe 1.3.

Downstream of the turbine 3, a catalyst 1.6a is provided in the exhaust gas pipe 1.1 which is designed as a 3-way catalyst or oxidation catalyst. Regardless of the embodiment examples described below, the used catalyst 1.6a, 1.6' can generally be a 3-way catalyst or an oxidation catalyst. An oxidation catalyst 1.6 is particularly considered when dealing with a lean-mixture gasoline engine 2.

Downstream of the catalyst 1.6a, another EGR pipe 1.3a branches off additionally or alternatively which ends upstream of the compressor 4 and forms a LP EGR. Inside, the particle filter 1.4a and the EGR cooler 1.7a as well as an EGR throttle valve 1.8a are provided. Basically, the throttle valve 1.8a* can also be provided upstream of the particle filter 1.4.

Alternatively, an EGR pipe 1.3a* can branch off upstream of the catalyst 1.6a. In this case, it is the particle filter 1.4ax with a 3-way catalytic coating or an oxidation coating to compensate for the circumvention of the catalyst 1.6a. It is also to be noted that, regardless of the embodiment examples described below, the coating of the used particle filter 1.4x, 1.4ax can generally be a 3-way catalyst coating or an oxidation coating. An oxidation coating is particularly considered when dealing with a lean-mixture driven gasoline engine 2.

Additionally (see dotted lines), a main particle filter 1.4' can be positioned within the exhaust gas pipe 1.1 downstream of the EGR pipe 1.3a.

As alternative A1 to this LP EGR, the catalyst 1.6a and the particle filter 1.4a downstream are arranged in the exhaust pipe 1.1, whereas the EGR pipe 1.3a branches off not until downstream of the particle filter 1.4a. The EGR cooler 1.7a and EGR throttle valve 1.8a are arranged in the EGR pipe 1.3a.

As additional alternative A2 to the LP EGR, the exhaust gas pipe 1.1 is equipped with two parallel exhaust gas pipe sections 1.1a, 1.1b which can be controlled by an adjustable valve 1.9. A main catalyst 1.6' is positioned in the exhaust gas pipe section 1.1a. In the parallel exhaust pipe section 1.1b both, the coated particle filter 1.4ax as well as the branch for the EGR pipe 1.3a, are arranged. A controllable bypass is thus available for the EGR pipe 1.3a, with the 3-way catalysis or at least the oxidation catalysis in the exhaust gas pipes 1.1a, 1.1b being achieved in both cases.

The adjustable valve 1.9 can also be implemented so that different sized partial exhaust masses can simultaneously flow through the parallel exhaust pipe sections 1.1a, 1.1b.

Furthermore, in the exhaust gas pipe section 1.1b, an uncoated particle filter 1.4a can alternatively be used. In this case, however (see dotted lines), the exhaust catalyst 1.6* would be built into the exhaust gas pipe 1.1 ahead of the division into both exhaust gas pipe sections 1.1a, 1.1b to ensure catalytic purification of the exhaust gas 8 in every valve position 1.9.

Figure 2:
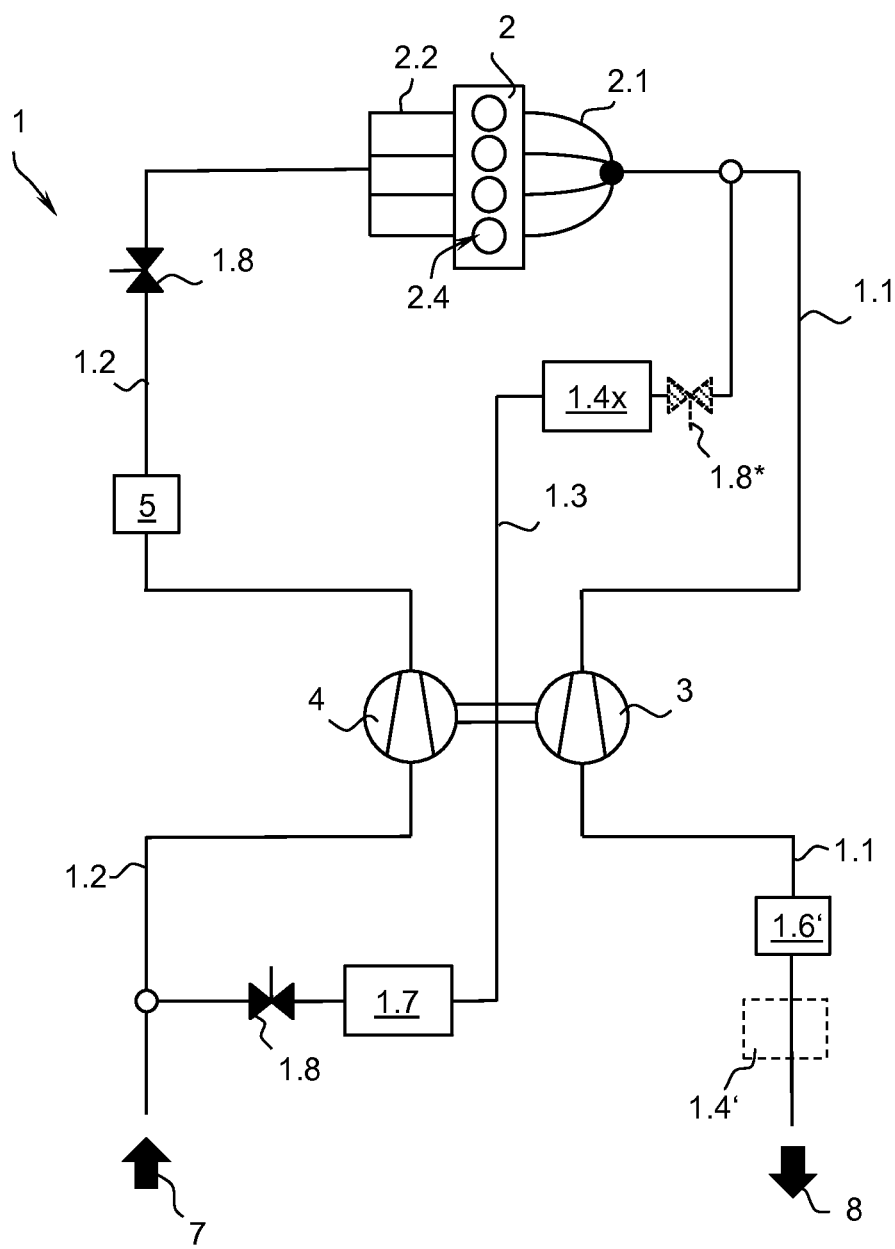
FIG. 2 a schematic diagram of a MP EGR.

FIG. 2 shows a MP EGR. The particle filter 1.4x, positioned in the EGR pipe 1.3, has a catalytic coating. Additionally, a main catalyst 1.6', preferably a 3-way catalyst, is provided in the exhaust gas pipe 1.1 downstream of the turbine 3. The throttle valve 1.8 is positioned downstream of the cooler 1.7. The throttle valve 1.8* can alternatively be provided upstream of the particle filter 1.4x. Additionally (see dotted lines), an uncoated main particle filter 1.4' can be positioned within the exhaust gas pipe 1.1 downstream of the main catalyst 1.6'.

Figure 3A:
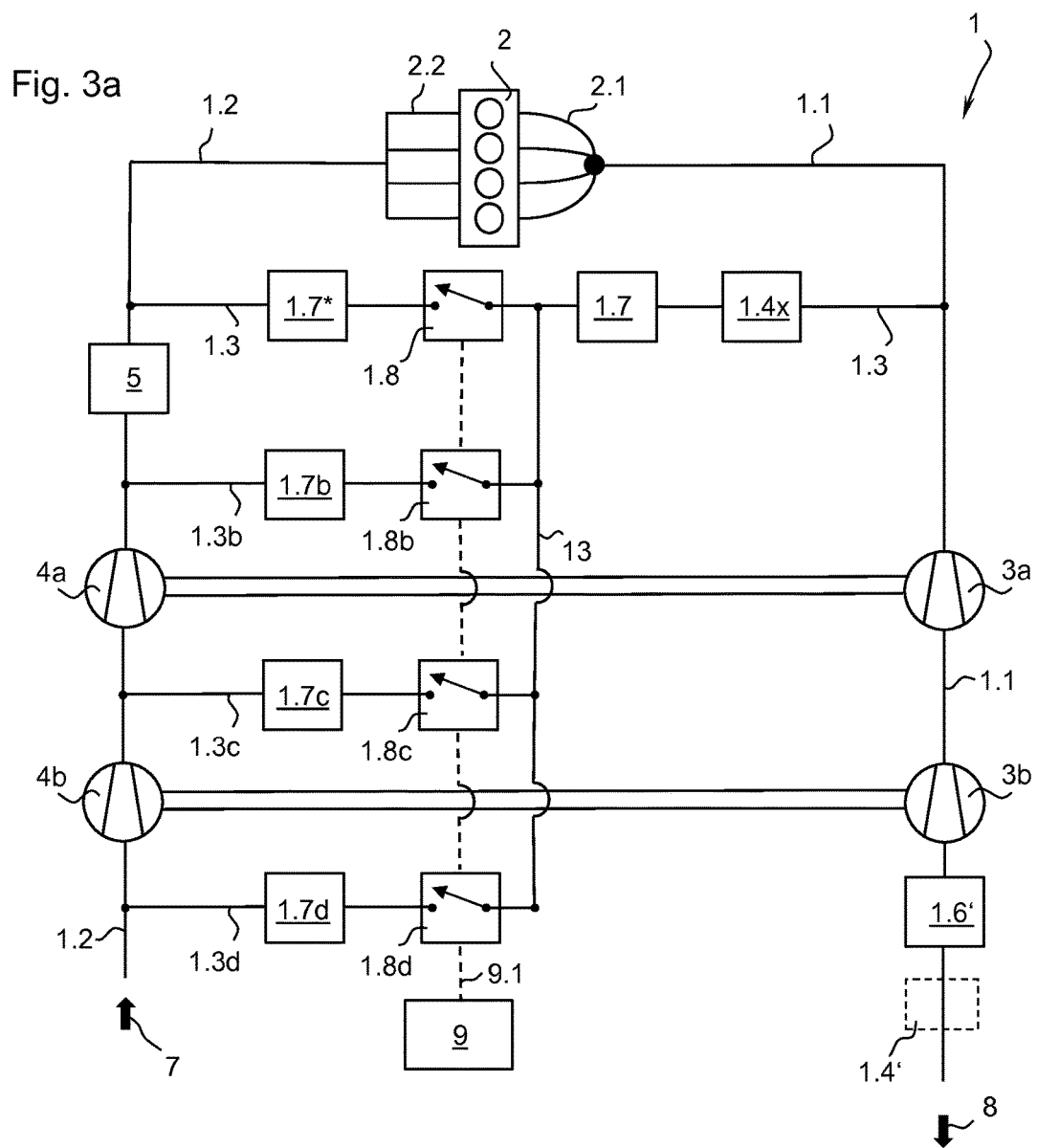
FIG. 3a, 3b schematic diagrams of a combined HP, MP and LP EGR

According to the example of FIG. 3a, based on the EGR pipe 1.3 which branches off from the exhaust gas pipe 1.1, the exhaust gas recirculation is passed on through further parallel EGR pipes 1.3b-1.3d. The particle filter 1.4x with catalytic coating and the cooler 1.7 are located in the EGR pipe 1.3. The EGR pipes 1.3b-1.3d each branch off at a supply pipe 13 which in turn branches off at the EGR pipe 1.3 downstream of the cooler 1.7. All EGR pipes 1.3-1.3d end at the inlet pipe 1.2. Each of these EGR pipes 1.3-1.3d has a throttle valve 1.8-1.8d downstream of the supply pipe 13, whereas all throttle valves 1.8-1.8d are connected to a control unit 9 via a control pipe 9.1 for the control or regulation of the position of each throttle valve 1.8-1.8d and can be individually controlled. Downstream of each throttle valve 1.8-1.8d, an additional cooler 1.7*, 1.7b-1.7d is arranged in each EGR pipe 1.3-1.3d. The inlet pipe 1.2 has two compressors 4a, 4b, each being coupled with a turbine 3a, 3b of the exhaust gas pipe 1.1. The EGR pipes 1.3, 1.3b both end downstream of the compressor 4a and form a HP EGR. The EGR pipe 1.3b ends upstream of the charge air cooler 5, while the EGR pipe 1.3 ends downstream of the charge air cooler 5.

The EGR pipe 1.3d ends upstream of the compressor 4b and forms a MP EGR. The EGR pipe 1.3c, however, ends between both compressors 4a, 4b and forms a reduced MP EGR.

The example of FIG. 3a can also be formed without the prefixed EGR cooler 1.7 in the EGR pipe 1.3 (not shown).

A 3-way catalyst (main exhaust catalyst) 1.6' is positioned downstream of the turbines 3a, 3b, from which the exhaust gas 8 or the main exhaust stream respectively circulates into the further exhaust gas system. Additionally (see dotted lines), an uncoated main particle filter 1.4' can be positioned within the exhaust gas pipe 1.1 downstream of the main exhaust catalyst 1.6'.

Figure 3B:
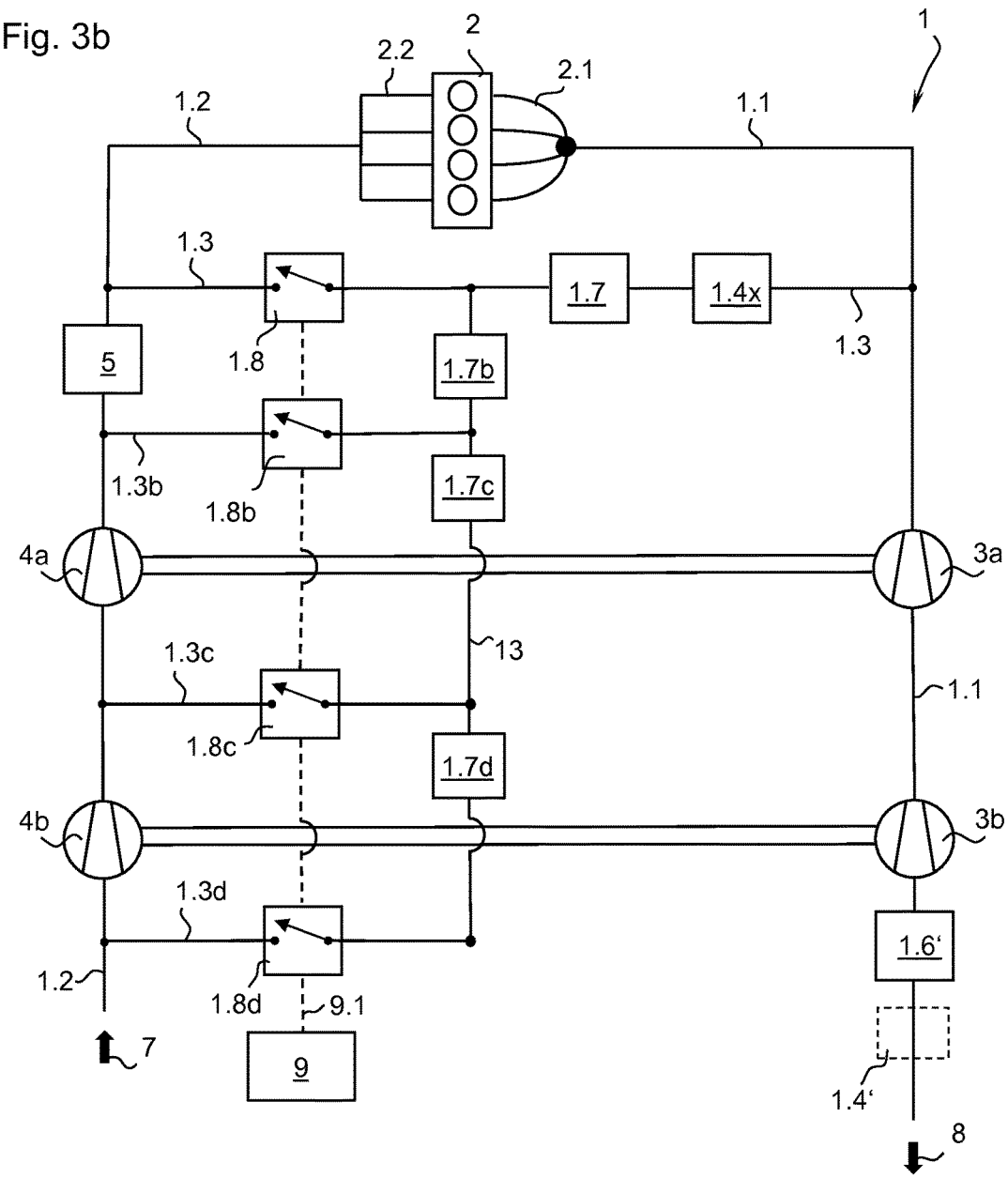

The example of FIG. 3b is made in a similar way. In this connection, a cooler 1.7 is provided in the EGR pipe 1.3, upstream of the branching off of the supply pipe 13, and three coolers 1.7b-1.7d are located in the supply pipe 13, each upstream of the branching off of the respective EGR pipe 1.3b-1.3d. Thus, a cooler 1.7* is less necessary than in the example according to FIG. 3a.

Both examples according to FIGS. 3a and 3b ensure an extremely flexible EGR circulation, so that extensive particle filtering and regeneration of the particle filter 1.4x on the one hand and the required circulation of cooled exhaust gas 8 into the inlet pipe 1.2 for an extensive operational range of the engine on the other hand are always ensured.

Figure 4A:
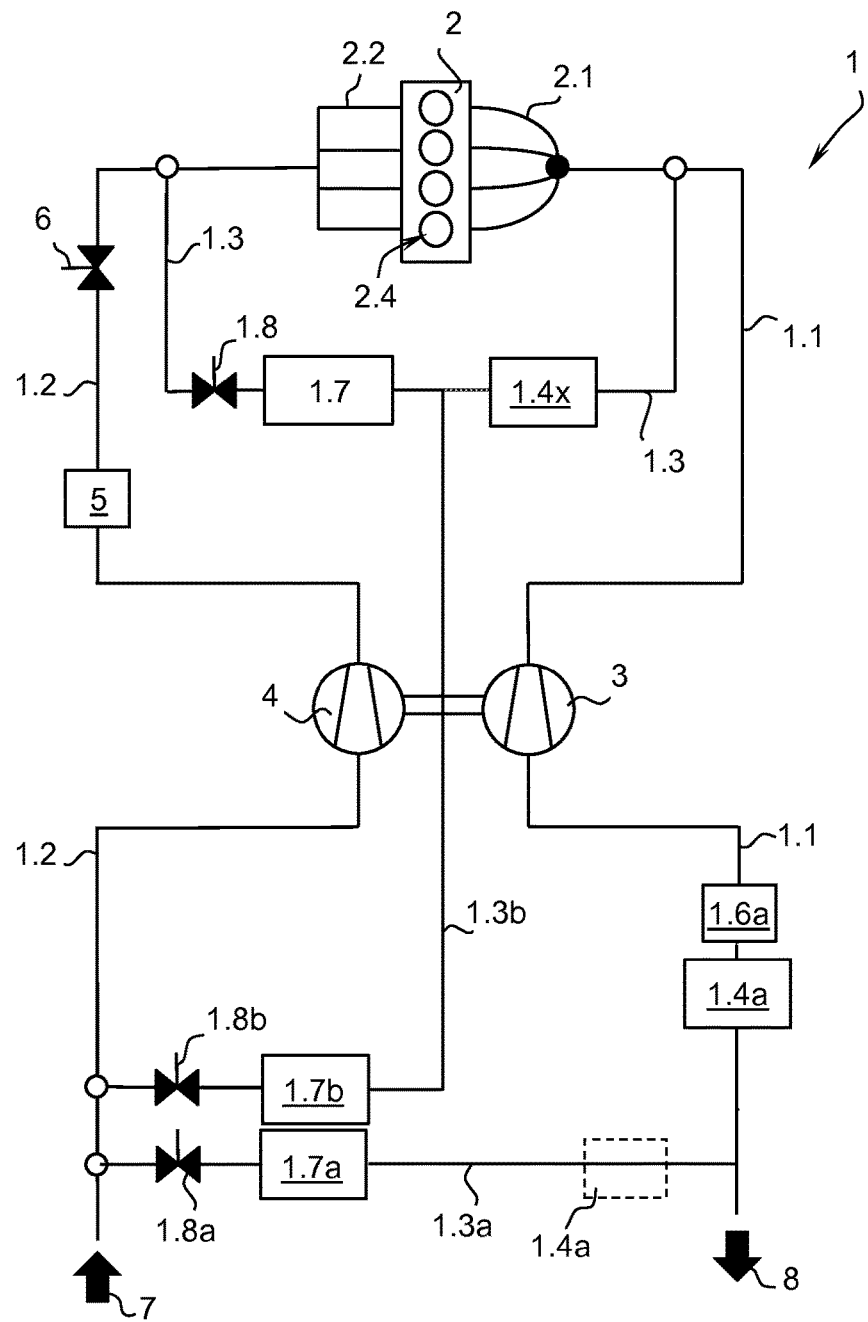
FIG. 4a, 4b schematic diagrams of a combined HP, MP and LP EGR with a different cooler arrangement and introduction to the inlet pipe.
Figure 4B:
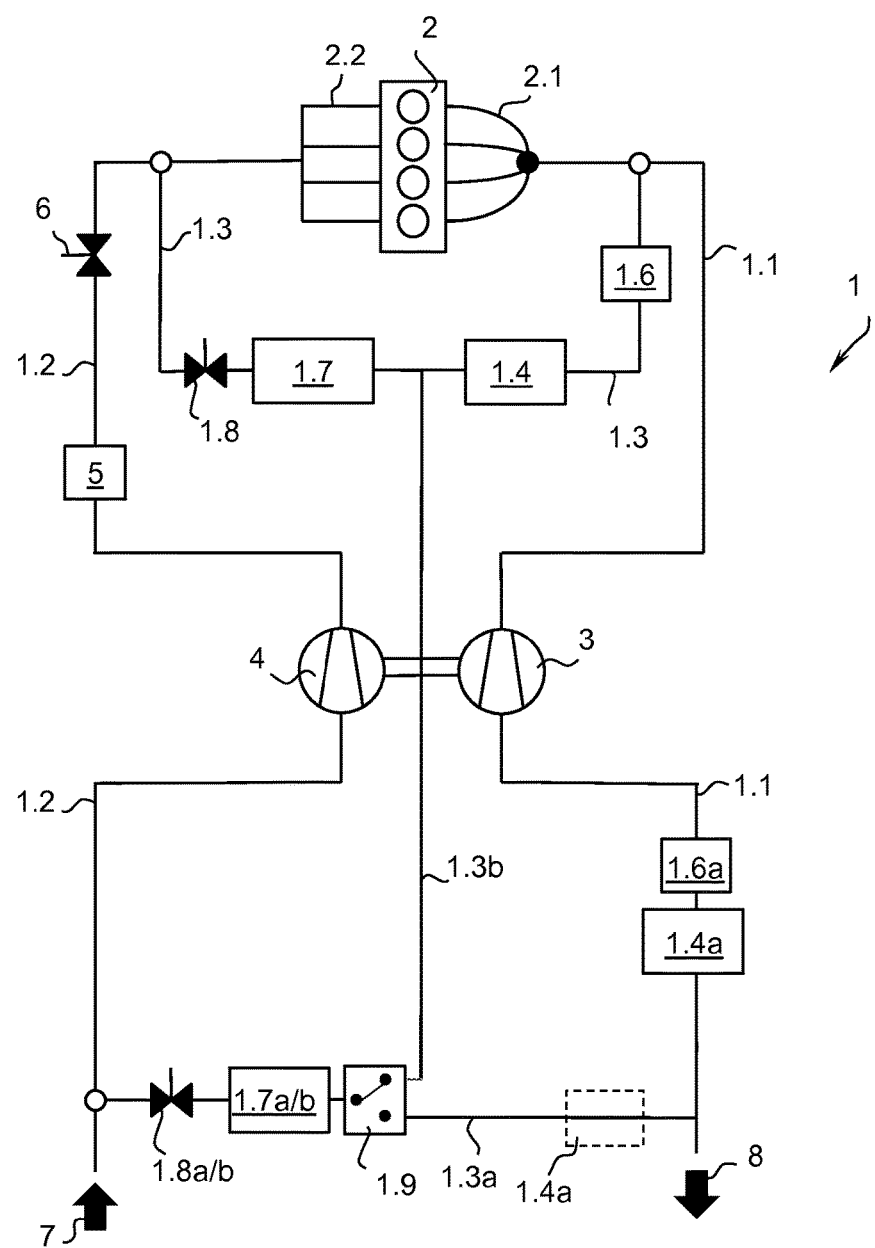

The examples according to FIGS. 4a, 4b contain a HP EGR, a MP EGR and a LP EGR. The charge air cooler 5 and the charge air throttle valve 6 are positioned in the inlet pipe 1.2, while the exhaust gas pipe 1.1 downstream of the turbine 3 is equipped with a 3-way catalyst 1.6a and a downstream particle filter 1.4a.

Per example of FIG. 4a, initially a coated particle filter 1.4x is provided in the EGR pipe 1.3. Subsequently, another EGR pipe 1.3b branches off. While the EGR pipe 1.3 flows into the inlet pipe 1.2 as a HP EGR downstream of the charge air-throttle valve 6, the EGR pipe 1.3b ends as a MP EGR upstream of the compressor 4. The cooler 1.7 and a downstream throttle valve 1.8 are provided in the EGR pipe 1.3 downstream of the EGR pipe 1.3b. A cooler 1.7b and a downstream throttle valve 1.8b are also provided in the EGR pipe 1.3b.

Additionally, a second EGR pipe 1.3a is provided which branches off downstream of the particle filter 1.4a, i. e. downstream of the turbine 3 on the exhaust gas pipe 1.1. This also has a cooler 1.7a and a downstream throttle valve 1.8a, before it flows into the inlet pipe 1.2 upstream of the compressor 4, thus making up a LP EGR. Additionally or alternatively (see dotted lines), the particle filter 1.4a can be positioned within the EGR pipe 1.3a.

The HP EGR as well as the MP EGR and the LP EGR can be combined in any form.

Unlike in example according to FIG. 4a, the EGR pipe 1.3b and EGR pipe 1.3a are coupled via an adjustable valve 1.9 in the example according to FIG. 4b. This has the advantage that a cooler 1.7a/b and a throttle valve 1.8a/b are less necessary. However, only the MP EGR or the LP EGR can be used as an addition or alternative to the HP EGR. Moreover, the particle filter 1.4 in the EGR pipe 1.3 is uncoated so that a further exhaust catalyst 1.6 is provided upstream.

Figure 5A:
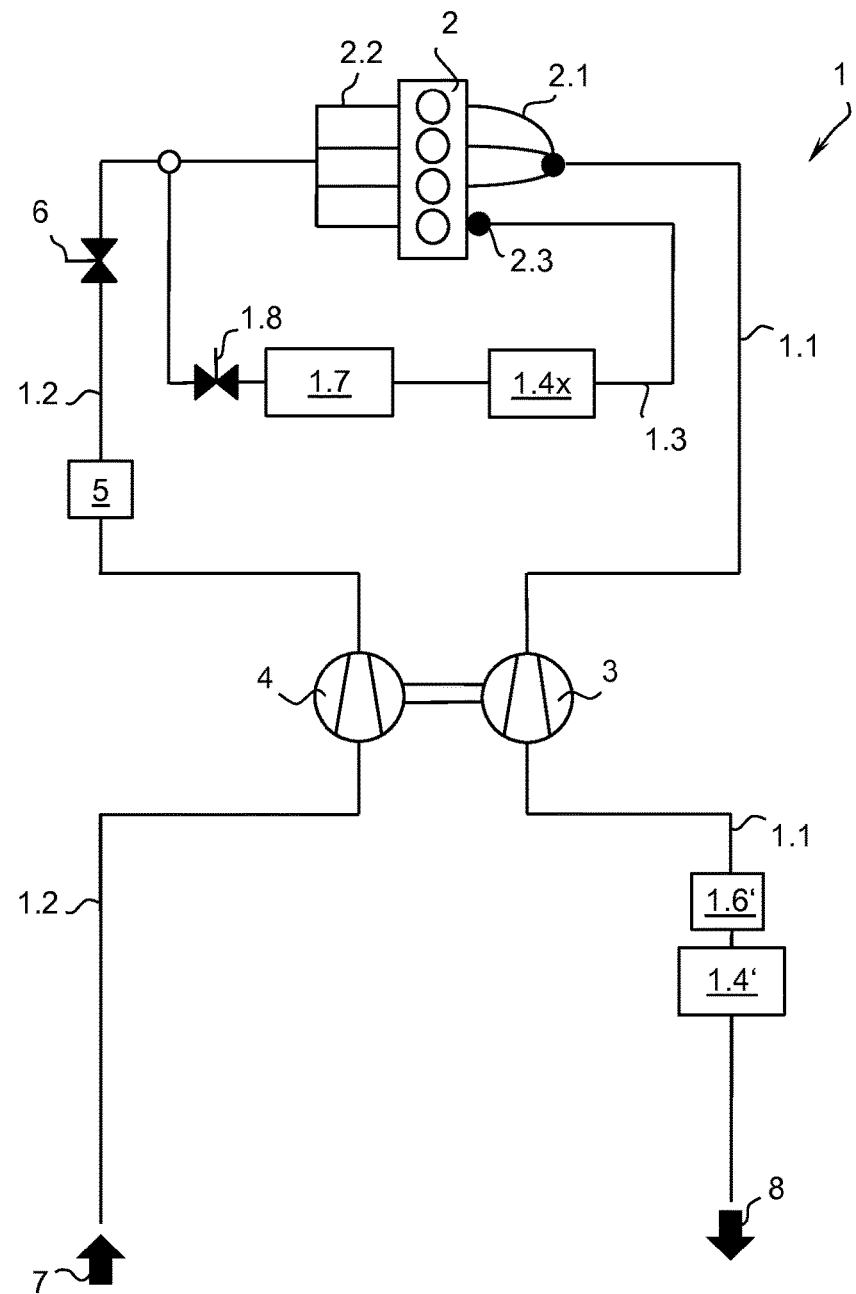
FIG. 5a schematic diagram of a HP EGR, and FIG. 5b schematic diagram of a partial HP or MP EGR, whereas the entire exhaust gas of a single cylinder is recirculated.
Figure 5B:
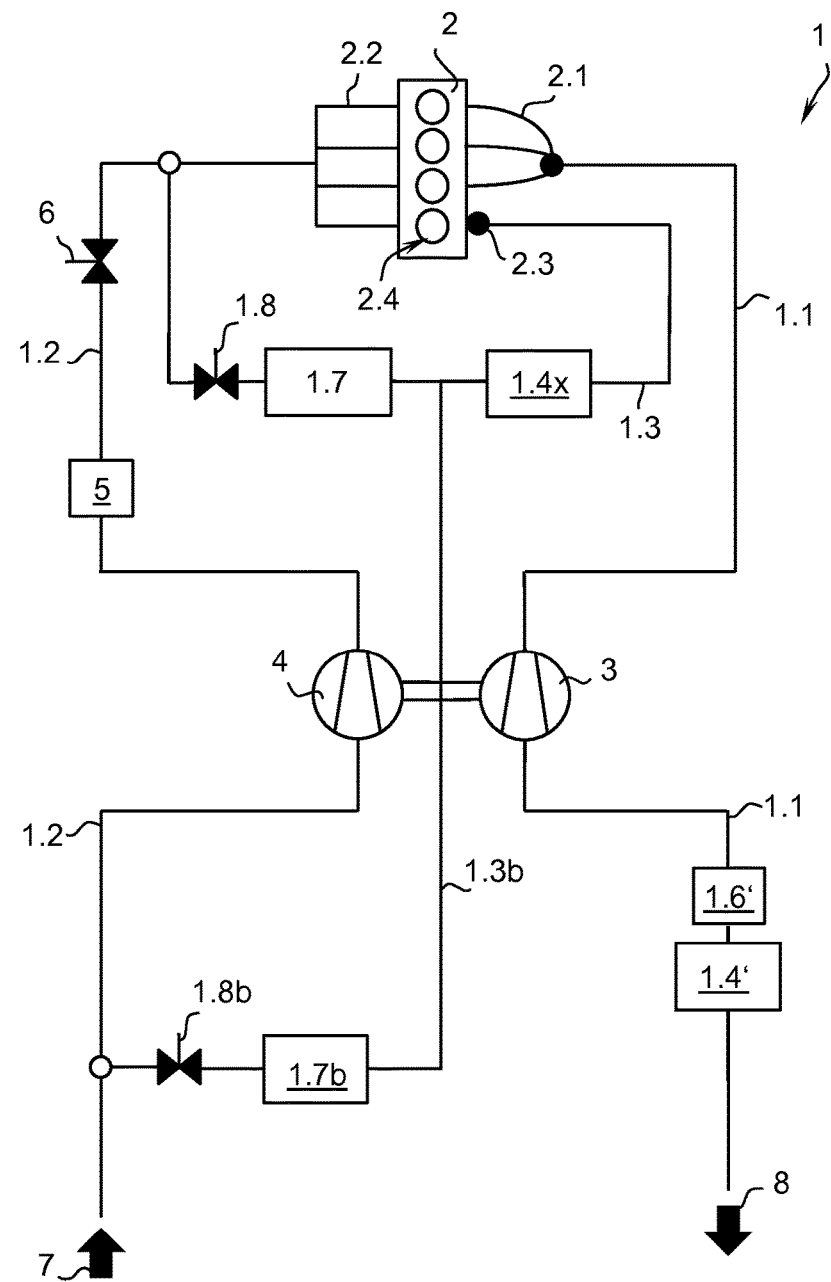

In the examples according to FIGS. 5a and 5b, the EGR pipe 1.3 is associated with a single cylinder outlet 2.3 of the gasoline engine 2 and circulates the amount of exhaust gas of this cylinder outlet 2.3. The charge air cooler 5 and the charge air throttle valve 6 are positioned in the inlet pipe 1.2, while the exhaust gas pipe 1.1 downstream of the turbine 3 is equipped with a 3-way catalyst 1.6' and a downstream main particle filter 1.4'.

The example according to FIG. 5a shows a HP EGR. The EGR pipe 1.3 has a coated particle filter 1.4' and a downstream cooler 1.7 as well as a throttle valve 1.8 positioned downstream of the cooler 1.7. In an example not shown here, an uncoated particle filter 1.4 can also be provided.

The example according to FIG. 5b shows a supplementary MP EGR. A further EGR pipe 1.3b branches off between the coated particle filter 1.4x and the cooler 11 which ends upstream of the compressor 4. In this EGR pipe 1.3b, another cooler 1.7b and a downstream throttle valve 1.8b are also positioned. In an example not shown here, an uncoated particle filter 1.4 can also be provided in the EGR pipe 1.3.

The exemplary embodiment in FIG. 6 essentially corresponds, with the exception of the position of the charge air throttle valve 6, to the version according to FIG. 1. However, in the inlet pipe 1.2, two coolers are provided. One charge air cooler 5.1 is positioned downstream of the opening of the first exhaust gas recirculation pipe 1.3, and a second, so-called fresh air cooler 5.2 is positioned upstream of the opening of the first exhaust gas recirculation pipe 1.3. In the downstream charge air cooler 5.1, the compacted and, in some cases, pre-cooled fresh air 7 is reduced together with the recirculated and pre-cooled exhaust gas 8 to the desired set temperature Ta. The turbine 3 is a VTG turbine of the same type and material quality as those commonly used in diesel engines.

REFERENCE LIST

1 Exhaust gas system/exhaust gas recirculation system
1.1 Exhaust gas pipe, main exhaust gas pipe
1.1a Exhaust pipe section
1.1b Exhaust pipe section
1.2 Inlet pipe, charge air pipe, fresh air pipe
1.3 First exhaust gas recirculation pipe, EGR pipe
1.3* First exhaust gas recirculation pipe, EGR pipe
1.3a Second exhaust gas recirculation pipe, EGR pipe
1.3a* Second exhaust gas recirculation pipe, EGR pipe
1.3b Further exhaust gas recirculation pipe, EGR pipe
1.3c Further exhaust gas recirculation pipe, EGR pipe
1.3d Further exhaust gas recirculation pipe, EGR pipe
1.4 Particle filter
1.4a Particle filter
1.4' Main particle filter
1.4x Particle filter, coated
1.4ax Particle filter, coated
1.6 Additional exhaust catalyst, 3-way catalyst, oxidation catalyst
1.6a Main exhaust catalyst, 3-way catalyst, oxidation catalyst
1.6' Main exhaust catalyst, 3-way catalyst, oxidation catalyst
1.6* Exhaust catalyst, 3-way catalyst, oxidation catalyst, alternatively
1.7 First cooler
1.7* Additional cooler
1.7a Second cooler
1.7b Further cooler
1.7c Further cooler
1.7d Further cooler
1.8 Throttle valve
1.8* Throttle valve, alternative, ahead of 1.7
1.8a Throttle valve
1.8a* Throttle valve
1 0.8a/b Throttle valve
1.8b Throttle valve
1.8c Throttle valve
1.8d Throttle valve
1.9 Valve, exhaust gas valve
2 Gasoline engine
2.1 Outlet manifold
2.2 Inlet manifold
2.3 Cylinder outlet
2.4 Combustion chamber/cylinder capacity
3 Turbine/VTG Turbine
3a Turbine/VTG Turbine
3b Turbine/VTG Turbine
4 Compressor
4a Compressor
4b Compressor
5 Charge air cooler, inlet air cooler
5.1 Charge air cooler
5.2 a second, so-called fresh air cooler
6 Charge air—throttle valve
7 Inlet air
8 Exhaust gas
9 Control unit
9.1 Control pipe
13 Supply pipe
A1 Alternative
A2 Alternative
Ta exhaust gas set temperature
Tf inlet air set temperature
Vf Total volume
Vm Volume

What is claimed is:

1. An exhaust gas system for a gasoline engine comprising:
an exhaust gas pipe connected to an outlet manifold of the gasoline engine to lead exhaust gas to a main exhaust 3-way catalyst, with an inlet pipe connectible to an inlet manifold of a gasoline engine;
a main exhaust 3-way catalyst and a turbine provided within the exhaust gas pipe;
at least one compressor provided in the inlet pipe;
at least one of:
A) at least one first exhaust gas recirculation pipe branching off from the exhaust gas pipe upstream of the turbine and ending in the inlet pipe downstream of the compressor;
at least one first particle filter positioned within at least one of
i) the first exhaust gas recirculation pipe; and ii) the exhaust gas pipe upstream of the first exhaust gas recirculation pipe; and B) at least a second exhaust gas recirculation pipe branching off from the exhaust gas pipe downstream of the turbine and ending in the inlet pipe upstream of the compressor and including at least one second particle filter is positioned within one or more of iii) the second exhaust gas recirculation pipe; and iv) the exhaust gas pipe upstream of the second exhaust gas recirculation pipe;

wherein at least one of the at least one first and at least one second particle filters has a coating with catalytic effect, converting CO, HC and NOx;

wherein one or more of i) a charge air cooler and ii) a charge air throttle valve are provided within the inlet pipe; and including an opening of the first exhaust gas recirculation pipe positioned upstream of a position of the charge air cooler.

2. An exhaust gas system for a gasoline engine comprising:

an exhaust gas pipe connected to an outlet manifold of the gasoline engine to lead exhaust gas to a main exhaust 3-way catalyst, with an inlet pipe connectible to an inlet manifold of a gasoline engine;

a main exhaust 3-way catalyst and a turbine provided within the exhaust gas pipe;

at least one compressor provided in the inlet pipe;

at least one of:

A) at least one first exhaust gas recirculation pipe branching off from the exhaust gas pipe upstream of the turbine and ending in the inlet pipe downstream of the compressor;

at least one first particle filter positioned within at least one of i) the first exhaust gas recirculation pipe; and ii) the exhaust gas pipe upstream of the first exhaust gas recirculation pipe; and B) at least a second exhaust gas recirculation pipe branching off from the exhaust gas pipe downstream of the turbine and ending in the inlet pipe upstream of the compressor and including at least one second particle filter positioned within one or more of iii) the second exhaust gas recirculation pipe; and iv) the exhaust gas pipe upstream of the second exhaust gas recirculation pipe;

wherein at least one of the at least one first and at least one second particle filters has a coating with catalytic effect, converting CO, HC and NOx;

wherein the second exhaust gas recirculation pipe branches off upstream or downstream of the main exhaust 3-way catalyst; and wherein the second particle filter provided in the second exhaust gas recirculation branching off upstream of the main exhaust 3-way catalyst is a coated particle filter.

3. The exhaust gas system according to claim 2, wherein the gasoline engine has a combustion chamber with at least a volume Vm; and wherein the first particle filter has a total volume Vf; wherein the total volume Vf is defined by 0.1 Vm<=Vf<=1 Vm or 0.1 Vm<=Vf<=0.5 Vm.

4. The exhaust gas system according to claim 3, wherein several particle filters are provided having the total volume Vf altogether.

5. An exhaust gas system for a gasoline engine comprising:

an exhaust gas pipe connected to an outlet manifold of the gasoline engine to lead exhaust gas to a main exhaust 3-way catalyst, with an inlet pipe connectible to an inlet manifold of a gasoline engine;

the main exhaust 3-way catalyst and a turbine provided within the exhaust gas pipe, at least one compressor provided in the inlet pipe;

at least one of:

A) at least one first exhaust gas recirculation pipe branching off from the exhaust gas pipe upstream of the turbine and ending in the inlet pipe downstream of the compressor;

at least one first particle filter positioned within the first exhaust gas recirculation pipe; and B) at least a second exhaust gas recirculation pipe branching off from the exhaust gas pipe downstream of the turbine and ending in the inlet pipe upstream of the compressor and including at least one second particle filter positioned within one or more of i) the second exhaust gas recirculation pipe; and ii) the exhaust gas pipe upstream of the second exhaust gas recirculation pipe;

wherein at least one of the at least one first and at least one second particle filters has a coating with catalytic effect, converting CO, HC and NOx, for continuously cleaning the recirculated gas to achieve a minimal contamination of components in an intake system;

wherein the second exhaust gas recirculation pipe branches off at least one of upstream and downstream of the main exhaust 3-way catalyst; and wherein the second particle filter provided in the second exhaust gas recirculation branching off upstream of the main exhaust 3-way catalyst is a coated particle filter.

6. The exhaust system according to claim 5, wherein at least one of further exhaust gas recirculation pipes is provided which branches off at the first exhaust gas recirculation pipe and ends in the inlet pipe; and wherein at least one exhaust gas recirculation cooler is provided within the at least one of the further exhaust gas recirculation pipes.

7. The exhaust system according to claim 6, wherein the at least one of the further exhaust gas recirculation pipes branches off downstream of the particle filter of the first exhaust gas recirculation pipe.

8. The exhaust gas system according to claim 6, wherein two compressors are arranged within the inlet pipe; and wherein the at least one of the further exhaust gas recirculation pipes ends between both compressors.

9. The exhaust gas system according to claim 6, wherein two compressors are arranged within the inlet pipe and at least two further exhaust gas recirculation pipes are provided which are connected in parallel via a common supply pipe branching off at the first exhaust gas recirculation pipe; and wherein one of the at least two further exhaust gas recirculation pipes ends at upstream of at least one of the compressors and another one of the at least two further exhaust gas recirculation pipes ends at downstream of the at least one of the compressors.

10. The exhaust gas system according to claim 6, wherein a charge air cooler is provided in the inlet pipe, wherein the opening of the at least one of the further exhaust gas recirculation pipes is positioned upstream of a position for the charge air cooler.

11. The exhaust gas system according to claim 6,
wherein a further exhaust gas recirculation cooler is provided at least one of within the respective further exhaust gas recirculation pipe and positioned in the supply pipe upstream of the respective further exhaust gas recirculation pipe.

12. The exhaust gas system according to claim 6,
wherein the second exhaust gas recirculation pipe and the further exhaust gas recirculation pipe are coupled via an adjustable valve;
wherein a cooler is provided downstream of the adjustable valve; and
wherein a throttle valve is provided downstream of the exhaust gas recirculation cooler.

13. The exhaust gas system according to claim 6, wherein a throttle valve is provided within the at least one of the further exhaust gas recirculation pipes respectively.

14. The exhaust gas system according to claim 13, wherein the throttle valve, which is within the at least one of the further exhaust gas recirculation pipes, is positioned downstream of the at least one of the exhaust gas recirculation cooler respectively.

15. The exhaust gas system according to claim 5, wherein the main exhaust catalyst is positioned downstream of the branch of the first exhaust gas recirculation pipe or upstream of the branch of the second exhaust gas recirculation pipe or downstream of the branch of the second exhaust gas recirculation pipe.

16. The exhaust gas system according to claim 5, wherein at least one exhaust gas recirculation cooler is provided
within at least one of i) the at least one first exhaust gas recirculation pipe and ii) the second exhaust gas recirculation pipe; and
downstream of at least one of i) the at least one second particle filter of the first exhaust gas recirculation pipe and ii) the particle filter of the second exhaust gas recirculation pipe.

17. The exhaust gas system according to claim 16, wherein the exhaust gas recirculation cooler has an exhaust gas set temperature on an output side that ranges above a dew point of any substances contained in an exhaust gas.

18. The exhaust gas system according to claim 5, wherein at least one of further exhaust gas recirculation pipes ends in the inlet pipe at downstream of the compressor or at upstream of the compressor.

19. The exhaust gas system according to claim 5,
wherein one or more of i) a charge air cooler and ii) a charge air throttle valve are provided within the inlet pipe; and
wherein an opening of the first exhaust gas recirculation pipe is positioned at least one of
a) downstream of a position of the charge air cooler;
b) downstream of a position of the charge air throttle valve; and
c) both downstream of the position of the charge air cooler and the charge air throttle valve.

20. The exhaust gas system according to claim 5,
wherein at least one of i) a charge air cooler and ii) a charge air throttle valve are provided within the inlet pipe; and
wherein an opening of the first exhaust gas recirculation pipe is positioned upstream of a position of the charge air cooler.

21. The exhaust gas system according to claim 20, wherein as a supplement to the charge air cooler, a fresh air cooler is positioned in the inlet pipe; and
wherein the fresh air cooler is positioned at upstream of the opening of the first exhaust gas recirculation pipe.

22. The exhaust gas system according to claim 21, wherein the fresh air cooler has a fresh air set temperature Tf on the outlet side with $150° >= Tf >= 90°$.

23. The exhaust gas system according to claim 5,
wherein a throttle valve is provided within at least one of i) the first exhaust gas recirculation pipe and ii) the second exhaust gas recirculation pipe, by which an exhaust mass flow within the first exhaust gas recirculation pipe is adjustable depending on an operating point; and
wherein the throttle valve is positioned downstream or upstream of the particle filter.

24. The exhaust gas system according to claim 5,
wherein a main particle filter is provided downstream of the main exhaust catalyst; and
wherein the main particle filter is free of a coating with catalytic effect, converting one or more of i) CO, ii) HC iii) and NOx.

25. The exhaust gas system according to claim 5, wherein the turbine is a VTG turbine.

26. An exhaust gas system for a gasoline engine comprising:
an exhaust gas pipe connected to an outlet manifold of the gasoline engine to lead exhaust gas to a main exhaust 3-way catalyst, with an inlet pipe connectible to an inlet manifold of a gasoline engine;
a main exhaust 3-way catalyst and a turbine provided within the exhaust gas pipe;
at least one compressor provided in the inlet pipe;
at least one of:
A) at least one first exhaust gas recirculation pipe branching off from the exhaust gas pipe upstream of the turbine and ending in the inlet pipe downstream of the compressor;
at least one first particle filter positioned within the first exhaust gas recirculation pipe; and
B) at least a second exhaust gas recirculation pipe branching off from the exhaust gas pipe downstream of the turbine and ending in the inlet pipe upstream of the compressor and including at least one second particle filter positioned within one or more of
i) the second exhaust gas recirculation pipe; and
ii) the exhaust gas pipe upstream of the second exhaust gas recirculation pipe;
wherein at least one of the at least one first and at least one second particle filters has a coating with catalytic effect, converting CO, HC and NOx, for continuously cleaning the recirculated gas to achieve a minimal contamination of components in an intake system;
wherein at least one third particle filter is provided, that is free of a coating with catalytic effect, converting one or more of i) CO, ii) HC and iii) NOx and is positioned downstream of the main catalyst and optionally a further exhaust catalyst is positioned within the first exhaust gas recirculation pipe upstream of the respective particle filter.

27. An exhaust gas system for a gasoline engine comprising:
an exhaust gas pipe connected to an outlet manifold of the gasoline engine to lead exhaust gas to a main exhaust 3-way catalyst, with an inlet pipe connectible to an inlet manifold of a gasoline engine;

the main exhaust 3-way catalyst and a turbine provided within the exhaust gas pipe;
at least one compressor provided in the inlet pipe;
at least one of:
A) at least one first exhaust gas recirculation pipe branching off from the exhaust gas pipe upstream of the turbine and ending in the inlet pipe downstream of the compressor;
at least one first particle filter positioned within the first exhaust gas recirculation pipe; and
B) at least a second exhaust gas recirculation pipe branching off from the exhaust gas pipe downstream of the turbine and ends in the inlet pipe upstream of the compressor and including at least one second particle filter positioned within one or more of
 i) the second exhaust gas recirculation pipe; and
 ii) the exhaust gas pipe upstream of the second exhaust gas recirculation pipe;
  wherein at least one of the at least one first and at least one second particle filters has a coating with catalytic effect, converting CO, HC and NOx, for continuously cleaning the recirculated gas to achieve a minimal contamination of components in an intake system; and
  wherein the exhaust gas pipe has two parallel running exhaust pipe sections which are switchable via an adjustable valve; and
  wherein the exhaust catalyst is positioned in the exhaust pipe section and the particle filter as well as a branch for a further exhaust gas recirculation pipe are provided in the parallel exhaust pipe section.

28. An exhaust gas system for a gasoline engine comprising:
an exhaust gas pipe connected to an outlet manifold of the gasoline engine to lead exhaust gas to a main exhaust 3-way catalyst, with an inlet pipe connectible to an inlet manifold of a gasoline engine;
the main exhaust 3-way catalyst and a turbine provided within the exhaust gas pipe;
at least one compressor provided in the inlet pipe;
at least one of:
A) at least one first exhaust gas recirculation pipe branching off from the exhaust gas pipe upstream of the turbine and ending in the inlet pipe downstream of the compressor;
at least one first particle filter positioned within the first exhaust gas recirculation pipe; and
B) at least a second exhaust gas recirculation pipe branching off from the exhaust gas pipe downstream of the turbine and ending in the inlet pipe upstream of the compressor and including at least one second particle filter positioned within one or more of
 i) the second exhaust gas recirculation pipe; and
 ii) the exhaust gas pipe upstream of the second exhaust gas recirculation pipe;
  wherein at least one of the at least one first and at least one second particle filters has a coating with catalytic effect, converting CO, HC and NOx, for continuously cleaning the recirculated gas to achieve a minimal contamination of components in an intake system;
  wherein one or more of i) a charge air cooler and ii) a charge air throttle valve are provided within the inlet pipe and including an opening of the first exhaust gas recirculation pipe positioned upstream of a position of the charge air cooler; and
  wherein at least one cooler is provided within one or more of i) the first exhaust gas recirculation pipe and ii) the second exhaust gas recirculation pipe and including the throttle valve provided at least one of downstream and upstream of the cooler.

* * * * *